United States Patent
Hara

(10) Patent No.: US 10,878,265 B2
(45) Date of Patent: Dec. 29, 2020

(54) IMAGE PROCESSING DEVICE AND IMAGE PROCESSING METHOD FOR SETTING IMPORTANT AREAS IN AN IMAGE

(71) Applicant: Ricoh Company, Ltd., Tokyo (JP)

(72) Inventor: Takayuki Hara, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 24 days.

(21) Appl. No.: 15/913,950

(22) Filed: Mar. 7, 2018

(65) Prior Publication Data
US 2018/0260646 A1    Sep. 13, 2018

(30) Foreign Application Priority Data

Mar. 13, 2017   (JP) .................................. 2017-047879

(51) Int. Cl.
*G06K 9/20*    (2006.01)
*G06K 9/62*    (2006.01)
*G06K 9/46*    (2006.01)

(52) U.S. Cl.
CPC ......... *G06K 9/2081* (2013.01); *G06K 9/4633* (2013.01); *G06K 9/6277* (2013.01)

(58) Field of Classification Search
CPC ... G06K 9/2081; G06K 9/4633; G06K 9/6277
See application file for complete search history.

(56) References Cited

U.S. PATENT DOCUMENTS

| 7,406,653 | B2* | 7/2008 | Ide ........................ G06F 16/35 |
| | | | 714/799 |
| 9,775,508 | B1* | 10/2017 | Docherty ............ G06K 9/6272 |
| 10,430,690 | B1* | 10/2019 | Chen .................... G06K 9/6289 |

(Continued)

FOREIGN PATENT DOCUMENTS

| JP | 3411971 | 3/2003 |
| JP | 4538008 | 6/2010 |

(Continued)

OTHER PUBLICATIONS

L. Itti, et al., "A model of saliency-based visual attention for rapid scene analysis," IEEE Transactions on Pattern Analysis & Machine Intelligence, vol. 20, No. 11, pp. 1254-1259, 1998.

(Continued)

*Primary Examiner* — Mia M Thomas
(74) *Attorney, Agent, or Firm* — Xsensus LLP

(57) ABSTRACT

An image processing device includes an importance calculating unit, a capturing-direction acquiring unit, a parameter estimating unit, and an important-area setting unit. The importance calculating unit is configured to calculate importance of each of a plurality of positions in an image. The capturing-direction acquiring unit is configured to acquire, for each of the positions, a capturing direction in a three-dimensional space. The parameter estimating unit is configured to regard importance distributions in respective capturing directions as a mixture distribution made up of element distributions, so as to estimate a parameter of each of the element distributions. The important-area setting unit is configured to set an important area from the image in accordance with the parameter.

20 Claims, 20 Drawing Sheets

(56) References Cited

U.S. PATENT DOCUMENTS

| | | | |
|---|---|---|---|
| 2007/0110273 A1* | 5/2007 | Hara | H04N 1/32309 382/100 |
| 2007/0172105 A1* | 7/2007 | Bahlmann | G06K 9/00 382/131 |
| 2007/0201749 A1* | 8/2007 | Yamauchi | G06T 7/11 382/225 |
| 2010/0066745 A1* | 3/2010 | Tsuda | G06K 9/00228 345/473 |
| 2010/0103463 A1* | 4/2010 | Joshi | H04N 1/00326 358/1.16 |
| 2013/0195359 A1* | 8/2013 | Yabu | G06K 9/34 382/171 |
| 2014/0321722 A1 | 10/2014 | Tsuda et al. | |
| 2015/0254819 A1* | 9/2015 | Hara | G06T 5/006 345/647 |
| 2016/0063311 A1 | 3/2016 | Tsuda et al. | |
| 2016/0357406 A1* | 12/2016 | Lee | G06T 11/60 |
| 2017/0161891 A1* | 6/2017 | Madabhushi | G06F 19/00 |
| 2018/0211113 A1* | 7/2018 | Wu | G06K 9/6277 |
| 2018/0359416 A1* | 12/2018 | Hold-Geoffroy | G06K 9/00664 |

FOREIGN PATENT DOCUMENTS

| | | |
|---|---|---|
| JP | 5339631 | 8/2013 |
| JP | 6023058 | 10/2016 |
| WO | 2006/082979 | 8/2006 |

OTHER PUBLICATIONS

F. Stentiford, "Attention Based Auto Image Cropping," In International Conference on Computer Vision Systems, 2007, 9 pages.

X. Huang, et al., "SALICON: Reducing the Semantic Gap in Saliency Prediction by Adapting Deep Neural Networks," Proceedings of the IEEE International Conference on Computer Vision. 2015, 9 pages.

Z. Zhang, "A flexible new technique for camera calibration," IEEE Transactions on Pattern Analysis and Machine Intelligence, 22, 11, pp. 1330-1334, 2000.

T. Flash and N. Hogan, "The coordination of arm movements: an experimentally confirmed mathematical model," The journal of Neuroscience, vol. 5, No. 7, pp. 1688-1703, 1985.

K. He, X. Zhang, S. Ren, J. Sun, "Deep Residual Learning for Image Recognition," in arXiv: 1512.03385, pp. 770-778, 2015.

* cited by examiner

*PROBABILITY DENSITY IS HIGHER IN ACCORDANCE WITH CLOSENESS TO WHITE

FIG.14
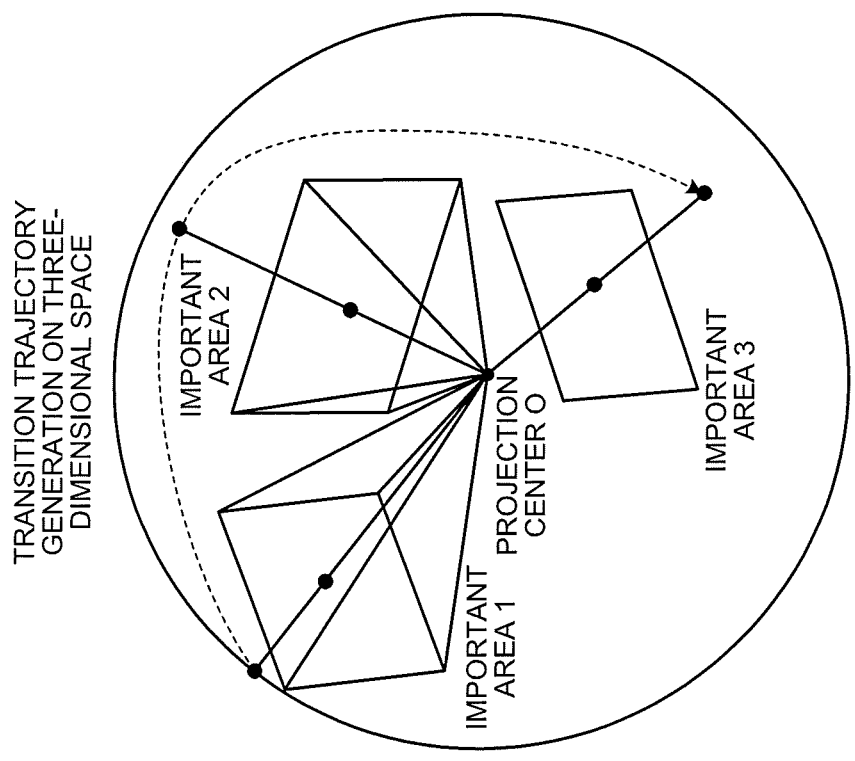
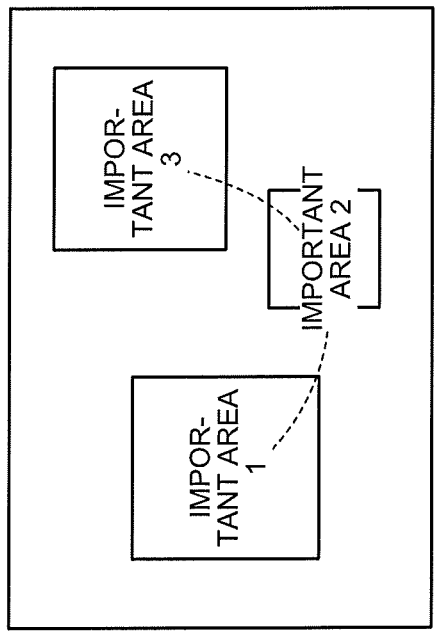

IMAGE PROCESSING DEVICE AND IMAGE PROCESSING METHOD FOR SETTING IMPORTANT AREAS IN AN IMAGE

CROSS-REFERENCE TO RELATED APPLICATIONS

The present application claims priority under 35 U.S.C. § 119 to Japanese Patent Application No. 2017-047879, filed on Mar. 13, 2017. The contents of which are incorporated herein by reference in their entirety.

BACKGROUND OF THE INVENTION

1. Field of the Invention

The present invention relates to an image processing device, an image processing method, and a computer program product.

2. Description of the Related Art

There is a conventionally known technology of extracting important areas from images. This technology is widely used for automatic cropping/thumbnail generation of images, preprocessing for annotation generation in image understanding/image searching, and the like. As the method of extracting important areas, there are known methods that use object recognition or saliency maps. For example, see the following literatures:
Japanese Unexamined Patent Application Publication No. 4538008 (Patent Literature 1);
Japanese Unexamined Patent Application Publication No. 3411971 (Patent Literature 2);
International Publication Pamphlet No. WO2006/082979 (Patent Literature 3);
Japanese Patent No. 6023058 (Patent Literature 4);
Japanese Patent No. 5339631 (Patent Literature 5);
L. Itti, et al., "A model of saliency-based visual attention for rapid scene analysis," IEEE Transactions on Pattern Analysis & Machine Intelligence, vol. 20, no. 11, pp. 1254-1259, 1998 (Non Patent Literature 1);
F. Stentiford, "Attention Based Auto Image Cropping," In International Conference on Computer Vision Systems, 2007 (Non Patent Literature 2);
X. Huang, et al., "SALICON: Reducing the Semantic Gap in Saliency Prediction by Adapting Deep Neural Networks," Proceedings of the IEEE International Conference on Computer Vision. 2015 (Non Patent Literature 3);
Z. Zhang, "A flexible new technique for camera calibration," IEEE Transactions on Pattern Analysis and Machine Intelligence, 22, 11, pp. 1330-1334, 2000 (Non Patent Literature 4);
T. Flash and N. Hogan, "The coordination of arm movements: an experimentally confirmed mathematical model," The journal of Neuroscience, vol. 5, no. 7, pp. 1688-1703, 1985 (Non Patent Literature 5); and
K. He, X. Zhang, S. Ren, J. Sun, "Deep Residual Learning for Image Recognition," in arXiv: 1512.03385, 2015 (Non Patent Literature 6).

According to conventional technologies, clustering is conducted on the importance distribution (including a saliency map) on the basis of the positional information on a captured image so that one or more important areas are extracted. However, if clustering is thus conducted on the basis of positions within the image, it is difficult to taking into consideration the relation of the actual capturing directions. For example, even if lens distortion is corrected by using the pinhole camera model, there is an angular difference between the shooting angle between neighboring pixels in the image central area and the shooting angle between neighboring pixels in the image peripheral area (see FIG. 1). This difference becomes more noticeable as the angle becomes wider, and it is an extremely large difference with fish-eye cameras, 360-degree cameras, full-spherical cameras, and the like.

Furthermore, according to conventional technologies, it is difficult to set important areas while considering the influence of the actual capturing direction.

SUMMARY OF THE INVENTION

According to one aspect of the present invention, an image processing device includes an importance calculating unit, a capturing-direction acquiring unit, a parameter estimating unit, and an important-area setting unit. The importance calculating unit is configured to calculate importance of each of a plurality of positions in an image. The capturing-direction acquiring unit is configured to acquire, for each of the positions, a capturing direction in a three-dimensional space. The parameter estimating unit is configured to regard importance distributions in respective capturing directions as a mixture distribution made up of element distributions, so as to estimate a parameter of each of the element distributions. The important-area setting unit is configured to set an important area from the image in accordance with the parameter.

BRIEF DESCRIPTION OF THE DRAWINGS

FIG. 14 is a diagram that illustrates an example of the case where a spline curve is determined in a three-dimensional space;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
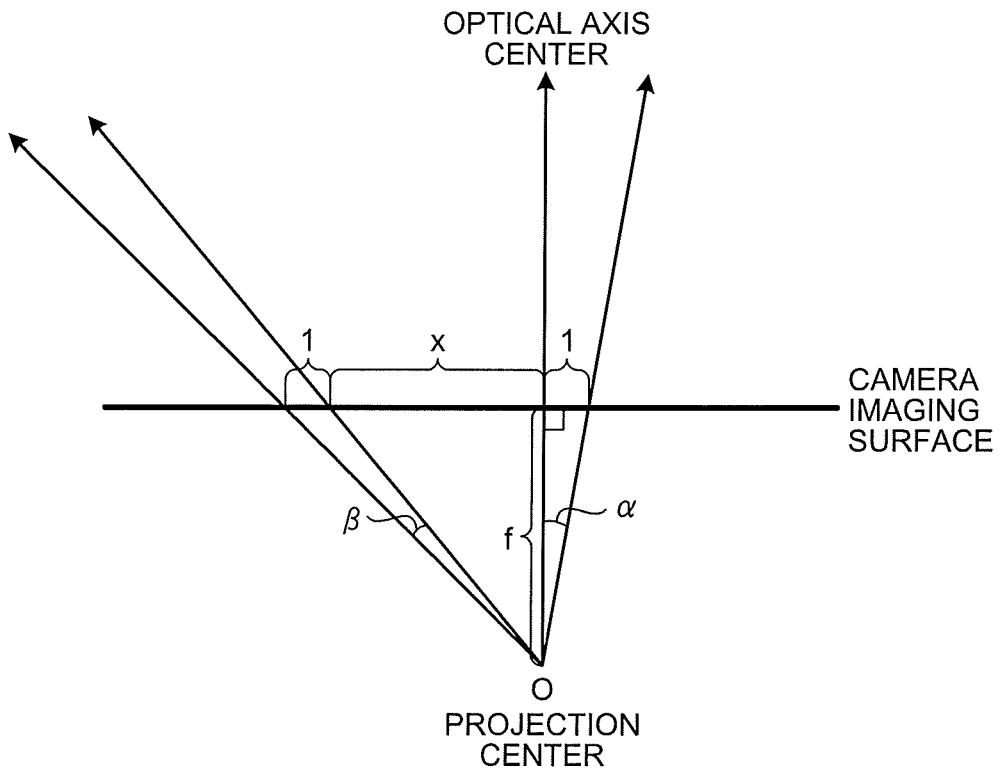
FIG. 1 is a diagram that illustrates a conventional problem.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an image processing device capable of setting important areas while considering the influence of the actual capturing direction.

First Embodiment

Figure 2:
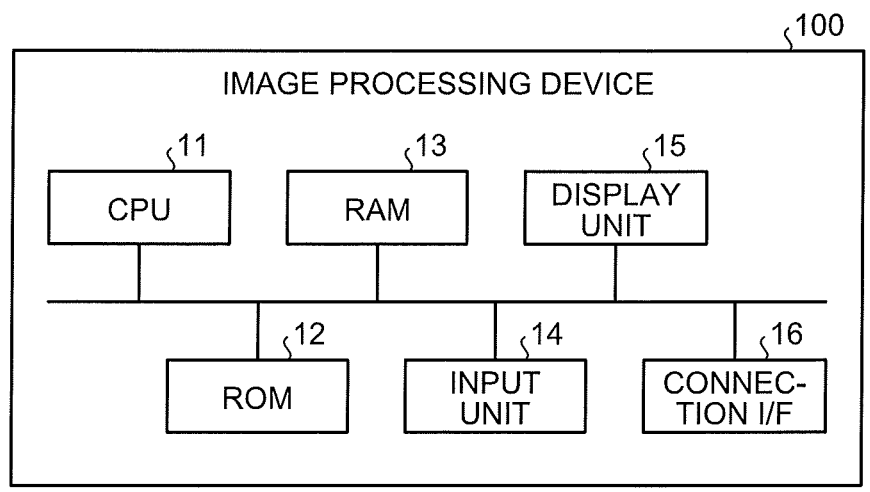
FIG. 2 is a diagram that illustrates an example of the hardware configuration of an image processing device according to a first embodiment.

FIG. 2 is a diagram that illustrates an example of the hardware configuration of an image processing device 100 according to the present embodiment. As illustrated in FIG. 2, the image processing device 100 includes a CPU 11, a ROM 12, a RAM 13, an input unit 14, a display unit 15, and a connection I/F 16.

The CPU 11 integrally controls operation of the image processing device 100. The CPU 11 uses a predetermined area of the RAM 13 as a work area to execute various control programs stored in the ROM 12, thereby implementing various functions provided by the image processing device 100. The details of the functions provided by the image processing device 100 are described later.

The ROM 12 is a non-volatile memory (unrewritable memory) that stores programs, various types of setting information, and the like, related to the image processing device 100.

The RAM 13 is a storage unit, such as SDRAM: it functions as a work area for the CPU 11, and it serves as a buffer, or the like.

The input unit 14 is a device that receives input (operation input) from the user. The display unit 15 is a device that displays various types of information related to the image processing device 100, and it is configured as for example a liquid crystal display. Furthermore, it may be configured as a touch panel, or the like, where the display unit 15 and the input unit 14 are integrally configured.

The connection I/F 16 is an interface for connecting an external device.

Figure 3:
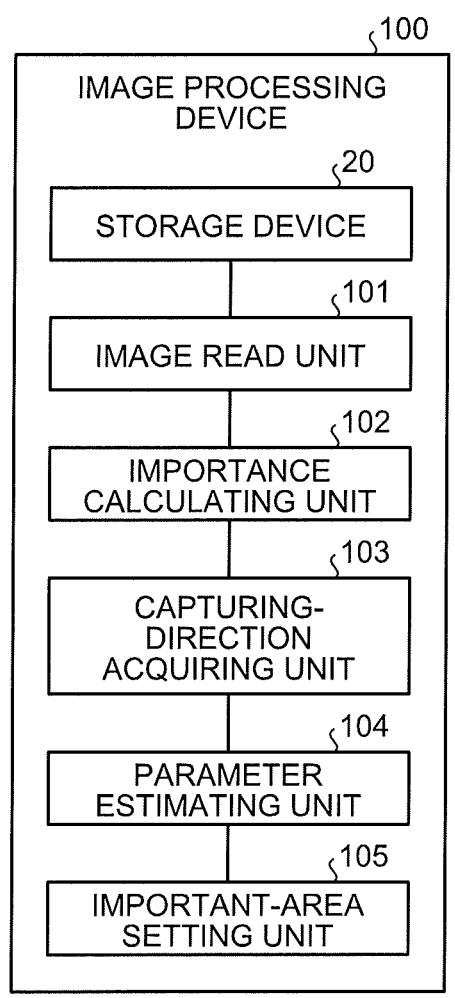
FIG. 3 is a diagram that illustrates an example of the functions provided by the image processing device according to the first embodiment.

FIG. 3 is a diagram that illustrates an example of the functions provided by the image processing device 100 according to the present embodiment. As illustrated in FIG. 3, the image processing device 100 includes a storage device 20, an image read unit 101, an importance calculating unit 102, a capturing-direction acquiring unit 103, a parameter estimating unit 104, and an important-area setting unit 105. In the example of FIG. 3, for the convenience of explanation, the functions related to the present embodiment are principally illustrated; however, the functions provided by the image processing device 100 are not limited thereto.

The storage device 20 is made up of the ROM 12, the RAM 13, a hard disk, an optical disk, or the like, as for example a semiconductor storage device. In this example, the image processing device 100 includes the storage device 20; however, this is not a limitation, and for example a configuration may be such that the storage device 20 made up of a hard disk, or the like, is connected to the image processing device 100 via the connection I/F 16. Here, the storage device 20 stores images that are targeted for processing. The images targeted for processing are captured images, or the like, which are captured by a capturing device such as a camera.

The image read unit 101 reads the image targeted for processing from the storage device 20.

The importance calculating unit 102 calculates the importance of each of the positions in the image read by the image read unit 101 as a process target image. The positions are on a per-pixel basis or are specific sampling positions, or the like. The method for calculating the importance is not particularly limited, and various methods may be used. For example, when a specific object, such as head or person, is extracted, a high importance may be set to the position where the specific object exists, saliency may be extracted by using the method disclosed in Non Patent Literature 1 or 3 so as to use the saliency as the importance, or a high importance may be set to a position of an important person that is identified as disclosed in Patent Literature 5. Furthermore, the sum importance calculated by using multiple methods may be used.

Figure 4:
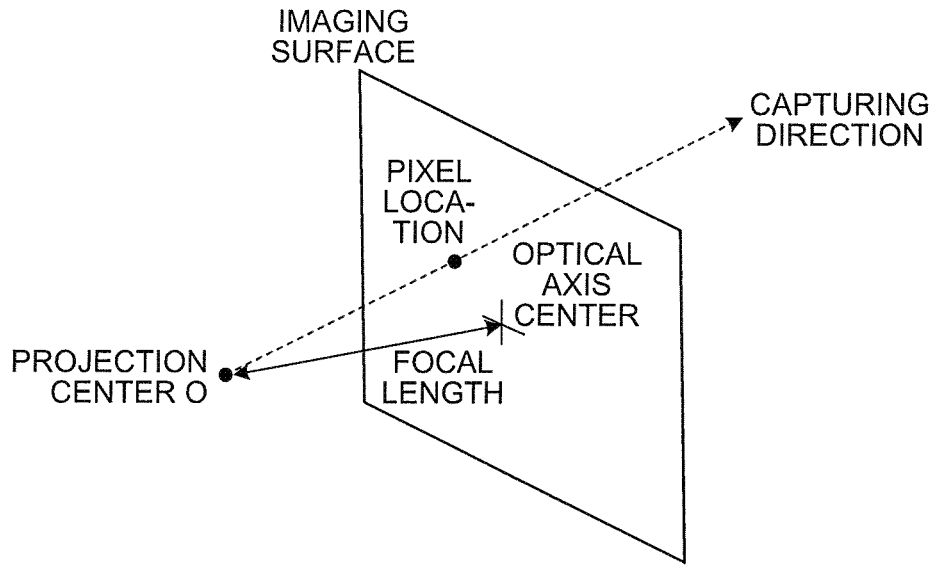
FIG. 4 is a diagram that illustrates a method for calculating a capturing direction according to the first embodiment.

The capturing-direction acquiring unit 103 acquires a capturing direction in a three-dimensional space for each of the positions in the image. The capturing direction with respect to a position in the image means the direction of a point in a three-dimensional space, captured at the position. Any coordinate system may be used to represent a direction, and typically the coordinate system using three axes in a horizontal direction, a vertical direction, and an optical axis direction of a camera imaging surface may be used. If the optical axis center and the focal length as internal camera parameters and lens distortion are already known, the capturing direction that corresponds to a position in the captured image may be calculated by considering reverse conversion of the perspective projection conversion as illustrated in FIG. 4.

Furthermore, as only the relative coordinates are needed for the subsequent processing, rotation and translation with respect to a world coordinate system do not need to be known as external camera parameters. Internal camera parameters and lens distortion may be used by being previously identified by using the method disclosed in, for example, Non Patent Literature 4.

The parameter estimating unit 104 regards importance distributions in the respective capturing directions as a mixture distribution made up of element distributions and estimates parameters of each of the element distributions. In this example, the element distribution is a von Mises-Fisher distribution. Furthermore, the parameters includes a first parameter μ that indicates the mean direction of an element distribution; and a second parameter k that indicates the degree to which the distribution is concentrated in the vicinity of the mean direction. Furthermore, the parameter estimating unit 104 may also use any of the k-means method, the EM algorithm, the variational Bayesian method, and the Monte Carlo method as the method for estimating the parameters of an element distribution. An explanation is given below of details of the method for estimating parameters according to the present embodiment.

Here, a three-dimensional von Mises-Fisher distribution is used as the element distribution. A D-dimensional von Mises-Fisher distribution has a probability density distribution that is represented by the following Equation (1) with the parameters (μ, k) with respect to a unit vector x in a D-dimensional Euclidean space.

$$f(x|\mu,\kappa) = C_D(\kappa)\exp(\kappa\mu^T x) \quad (1)$$

$x \in R^D, \|x\|=1$
$\mu \in R^D, \|\mu\|=1$
$\kappa \in R, \kappa \geq 0$

Here, $C_D(k)$ is a normalization constant. This distribution is used as an element distribution, and the mixture von Mises-Fisher distribution p(x) made up of M element distributions is represented by the following Equation (2).

$$p(x|\mu,\kappa,\pi) = \prod_{m=1}^{M} \pi_m f(x|\mu_m,\kappa_m) \quad (2)$$

Figure 5:
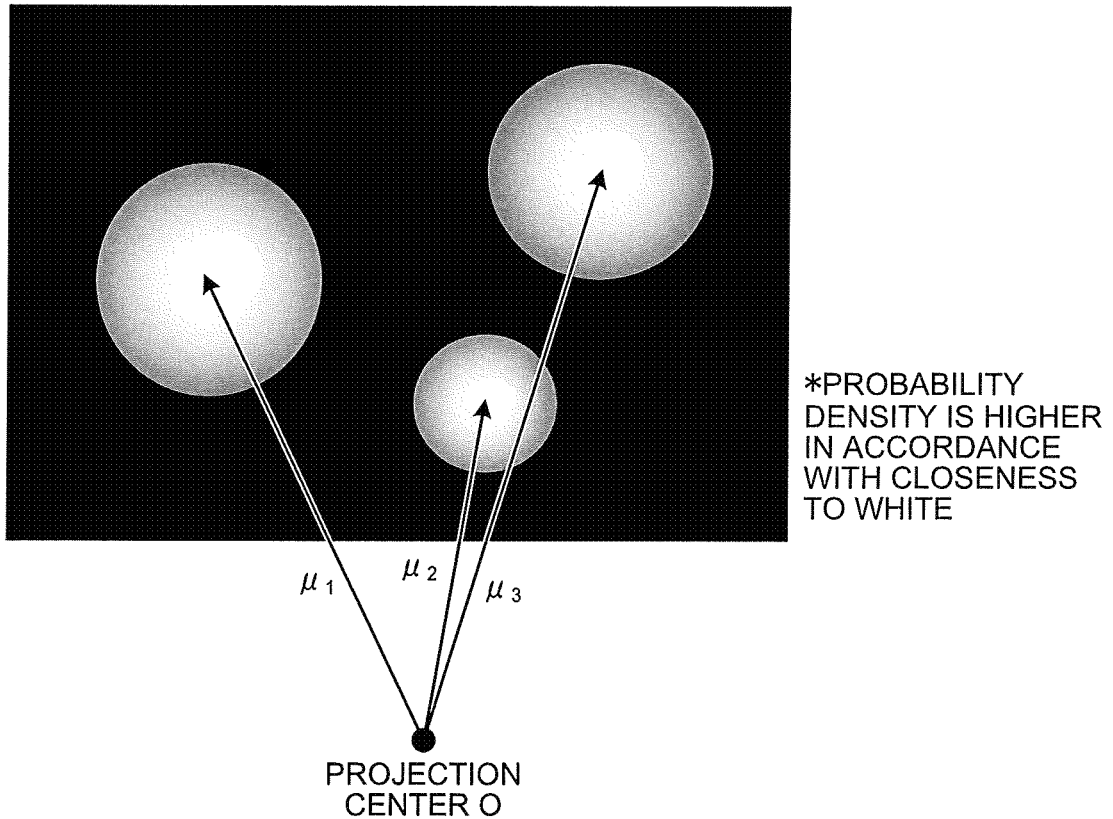
FIG. 5 is a diagram that illustrates a modeled image of the importance distribution with respect to the capturing direction.

$\mu = \{\mu_m\}_{m=1}^{M}$
$\kappa = \{\kappa_m\}_{m=1}^{M}$
$\pi = \{\pi_m\}_{m=1}^{M}$ In the above-described Equation (2), πi is a parameter of the mixing rate. FIG. 5 is a diagram that illustrates a modeled image of the importance distribution with respect to the capturing direction x by using p(x). Capturing directions obtained by the capturing-direction acquiring unit 103 are discretized into N directions, and the set of the capturing directions is $D=\{x_n\}_{n=1}^{N}$. Furthermore, the hidden variable $Z=\{\{Z^n_m\}_{n=1}^{N}\}_{m=1}^{M}$ is introduced, and $Z^n_m$ is 1 if the capturing direction $x_n$ belongs to the element distribution m and $Z^n_m$ is zero if it does not belong thereto. If the importance with respect to the capturing direction $x_n$ is $I(x_n)$, the joint probability of D, Z when the importance distribution is represented by the above-described Equation (2) is represented by the following Equation (3).

$$p(D,Z|\mu,\kappa,\pi) = \prod_{n=1}^{N}\prod_{m=1}^{m} \{\pi_m f(x_n|\mu_m,\kappa_m)\}^{Z^n_m I(x_n)} \quad (3)$$

Then, a consideration is given to the likelihood function from which the hidden variable Z has been removed through integration (summation over the domain of definition) and which is represented by the following Equation (4).

$$L(D|\mu,\kappa,\pi) = \sum_Z p(D,Z|\mu,\kappa,\pi) \quad (4)$$

The parameters μ, k, and π are calculated so as to maximize the likelihood function. For maximization of the likelihood function, non-linear programming such as the Newton's method or the EM algorithm may be used. Furthermore, the k-means method may be used for simplification of the EM algorithm. Moreover, as the discretized capturing directions $D=\{x_n\}_{n=1}^{N}$ are not at equal intervals, it is preferable that a product-sum operation is performed by multiplication by a compensation coefficient corresponding to an interval in the above-described Equation (3) As described above, the parameter estimating unit 104 estimates the parameters of each element distribution.

An explanation is continued with reference back to FIG. 3. The important-area setting unit 105 sets an important area from the image to be processed in accordance with the parameters estimated by the parameter estimating unit 104. Specifically, a partial image that is an important area is generated whose position, size, shape, and projection method correspond to the parameters. If the parameter estimating unit 104 uses the three-dimensional von Mises-Fisher distribution as an element distribution, the important-area setting unit 105 sets an important area by setting the mean direction μ of the element distribution as a center and determining its size based on the degree of concentration k. It is assumed that the shape of an important area is rectangular, and the size of the rectangle may be set such that the cumulative probability of the element distribution within the rectangle is 0.9, or the like, as a specific threshold. The same holds for shapes other than a rectangle. If the important area is shaped like a circle, the cumulative probability is analytically calculated so that the speed of calculation may be increased.

Figure 6:
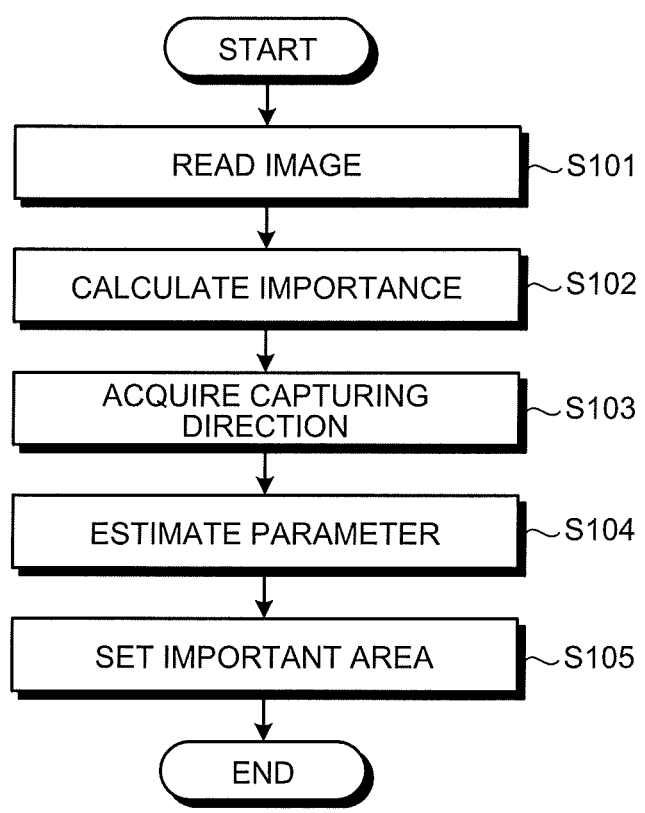
FIG. 6 is a flowchart that illustrates an operation example of the image processing device according to the first embodiment.
Figure 7:
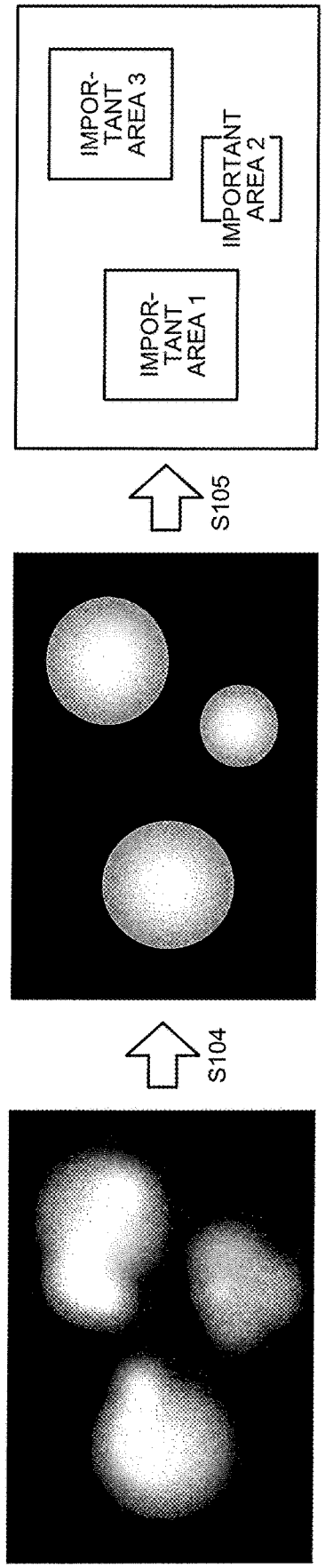
FIG. 7 is an imaginary diagram that illustrates a situation where important areas are set.

FIG. 6 is a flowchart that illustrates an operation example of the image processing device 100 according to the present embodiment. As the details of each step are described above, the detailed explanation is omitted as appropriate. First, the image read unit 101 reads the image to be processed from the storage device 20 (Step S101). Next, the importance calculating unit 102 calculates the importance of each position in the image read at Step S101 (Step S102). Then, the capturing-direction acquiring unit 103 acquires the capturing direction in a three-dimensional space for each of the above-described positions (Step S103). Then, the parameter estimating unit 104 regards the importance distributions in the respective capturing directions as a mixture distribution made up of element distributions and estimates the parameters of each element distribution (Step S104). Then, the important-area setting unit 105 sets one or more important areas from the image read at Step S101 in accordance with the parameters estimated at Step S104 (Step S105). FIG. 7 is an imaginary diagram that illustrates a situation where important areas are set through the above-described Step S104 to Step S105. FIG. 7 illustrates an example where the importance distribution having a complicated shape is approximated to a mixture von Mises-Fisher distribution, and an important area is set as a rectangle having the size that corresponds to the spread (the degree of concentration k) of each element distribution and having the same center as the center of the element distribution.

As described above, one or more important areas may be set from the image that is input as the image to be processed. With conventional 360-degree cameras or full-spherical cameras, the relation of connection between pixels in the captured image is looped (the imaging surface may be regarded as being a spherical surface or part of a spherical surface), and clustering in a two-dimensional Euclidean space cannot reflect the effect of loop. Here, the loop means the relation of connection such that a certain pixel connects to adjacent pixels in a specific direction and then returns to the original certain pixel. Therefore, according to the present embodiment, clustering is conducted (i.e., parameters of an element distribution of the mixture distribution are obtained) on consideration of the importance distribution with respect to the capturing direction so that an extraction result of an important area may reflect the angular difference depending on the actual capturing direction. Thus, particularly with regard to the images that are captured with a wide angle, a important area may be extracted from a central region and a peripheral region with the same standard. For example, it is possible to prevent large important areas from being likely to be generated in a peripheral region having a small difference in the shooting angle between adjacent pixels.

As described above, according to the present embodiment, important areas are settable while considering the influence of the actual capturing direction.

Furthermore, although in the above-described example maximum likelihood estimation is used to calculate parameters, this is not a limitation. It is also possible that prior distributions $p(\mu)$, $p(k)$, and $p(\pi)$ are set for the parameters $\mu$, $k$, and $\pi$ and posterior distributions of the parameters $\mu$, $k$, and $\pi$ with respect to D are obtained. To finally determine a single parameter, the expected value or the largest value of the posterior distribution may be used. Typically, to obtain the posterior distributions of the parameters $\mu$, $k$, and $\pi$, the processing cost for deriving the marginal likelihood is high. Therefore, the variational Bayesian method may be used to approximately derive the posterior distribution. First, consideration is given to the likelihood function that is represented by the following Equation (5).

$$p(D) = \sum_Z \int\int\int_{\mu,\kappa,\pi} p(D, Z | \mu, \kappa, \pi)p(\pi)p(\mu)p(\kappa)d\mu d\kappa d\pi \quad (5)$$
$$= \sum_Z \int\int\int_{\mu,\kappa,\pi} p(D, Z, \mu, \kappa, \pi)d\mu d\kappa d\pi$$

Here, the parameter distribution $q(Z, \mu, k, \pi)$ is introduced, and consideration is given to the lower bound of the log likelihood represented by the following Equation (6).

$$\log p(D) = \log \sum_Z \int\int\int_{\mu,\kappa,\pi} p(D, Z, \mu, \kappa, \pi)d\mu d\kappa d\pi \quad (6)$$
$$= \log \sum_Z \int\int\int_{\mu,\kappa,\pi} q(Z, \mu, \kappa, \pi) \frac{p(D, Z, \mu, \kappa, \pi)}{q(Z, \mu, \kappa, \pi)} d\mu d\kappa d\pi$$
$$\geq \sum_Z \int\int\int_{\mu,\kappa,\pi} q(Z, \mu, \kappa, \pi) \frac{p(D, Z, \mu, \kappa, \pi)}{q(Z, \mu, \kappa, \pi)} d\mu d\kappa d\pi$$

The parameter distribution $q(Z, \mu, k, \pi)$ is obtained so as to maximize the lower bound of the log likelihood (the parameter distribution $q(Z, \mu, k, \pi)$ is obtained, with which the lower bound of the likelihood is maximized when there is a match with the posterior distribution). The variational Bayesian method is to obtain a distribution by assuming the independence of parameters in the parameter distribution $q(Z, \mu, k, \pi)$. As for a prior distribution, it is preferable to set a von Mises-Fisher distribution for $p(\mu)$, a log-normal distribution for $p(k)$, and a Dirichlet distribution for $p(\pi)$; however, this is not a limitation. By setting the prior distribution as described above, robustness is increased, and accuracy is improved particularly when there is a small amount of data. Furthermore, as the method for obtaining the posterior distribution of a parameter, a Markov chain Monte Carlo method may be used other than the variational Bayesian method. Furthermore, as an element distribution, distributions other than the von Mises-Fisher distribution may be also set. For example, the element distribution may be a probability density function that is represented by the following Equation (7) to which a second-order term is introduced.

$$f(x|\mu,\kappa,Q) \propto \exp(k\mu^T x + x^T Q x) \quad (7)$$

Similarly, a probability density function with equal to or more than a third-order term may be considered, and a parameter may be estimated by using the Markov chain Monte Carlo method. Furthermore, as an example of other than an exponent function type, the element distribution may be represented as a linear combination of base distributions $\eta = \{\eta_1\}$ at a mixing rate $\alpha = \{\alpha_1\}$ as in the following Equation (8).

$$f(x | \alpha, \eta) \propto \sum_{i=1}^{M} \alpha_i \eta_i(x) \quad (8)$$

The above settings cause a mixture distribution in two stages as a whole, and the parameters $\alpha$, $\eta$ may be calculated by using the EM algorithm, the variational Bayesian method, or the Monte Carlo method in stages. Alternatively, the base distribution $\eta$ may be previously set so that only $\alpha$ is estimated with regard to the image to be processed. In this case, the base distribution $\eta$ may be manually set or may be calculated by maximum likelihood estimation, MAP estimation, Bayes' estimation, or the like, using the importance distribution having the manually set structure as training data.

Furthermore, the element distributions do not need to be distributions of the same system, and distributions in various forms may be used in combination. Specifically, it is possible that an element distribution $f_m$ having a parameter $\theta_m$ is set and the above-described Equation (2) is replaced with the probability density function represented by the following Equation (9).

$$p(x|\theta) = \prod_{m=1}^{M} \pi_m f_m(x|\theta_m) \quad (9)$$

In the same manner as the Von Mises-Fisher distribution, it is also possible that a prior distribution is assumed for $\theta_m$ and a posterior distribution is obtained for $\theta_m$ by using the variational Bayesian method or the Monte Carlo method. This may lead to an increase in the variety of important areas generated. Even if distributions other than the von Mises-Fisher distribution are used for element distributions, it is also possible that the mean of the element distributions is set as the center of an important area and its size or shape is determined such that the cumulative probability of the element distribution becomes a specific value during the important-area setting at Step S105 of FIG. 6. In the above example, the mixing rate does not depend on the capturing direction; however, by assuming that each of the capturing directions $x_n$ has a different mixing rate $\pi^n{}_m$, the above-described Equation (2) may be replaced with the following Equation (10) (topic model).

$$p(x_n|\theta) = \prod_{m=1}^{M} \pi_m^n f_m(x_n|\theta_m) \quad (10)$$

In this case, too, a likelihood function is configured based on the same discussion as that described above, and the parameter θ of an element distribution may be obtained by using the EM algorithm, the variational Bayesian method, or the Monte Carlo method. In this model, each capturing direction may belong to multiple element distributions, and overlapped and varied partial-image division is achieved such that a single capturing direction is included in multiple partial images.

In the above example, the number M of element distributions is fixed; however, the number of element distributions may be adaptively determined in accordance with an image. For example, a possible method is to conduct clustering with sufficiently large M, calculate the mixing rate π of each element distribution, and in the end use the cluster where the mixing rate is equal to or more than a specific threshold. Furthermore, the number of clusters is narrowed down with the mixing rate and M is updated so that clustering may be conducted again. Moreover, it is also possible to use a method (Nonparametric Bayesian method) in which the infinite mixture of an element distribution is considered, a Dirichlet process is set for p(π) so that the parameter is estimated, and the cluster where the mixing rate is equal to or more than a specific threshold is finally used.

Second Embodiment

Figure 8:
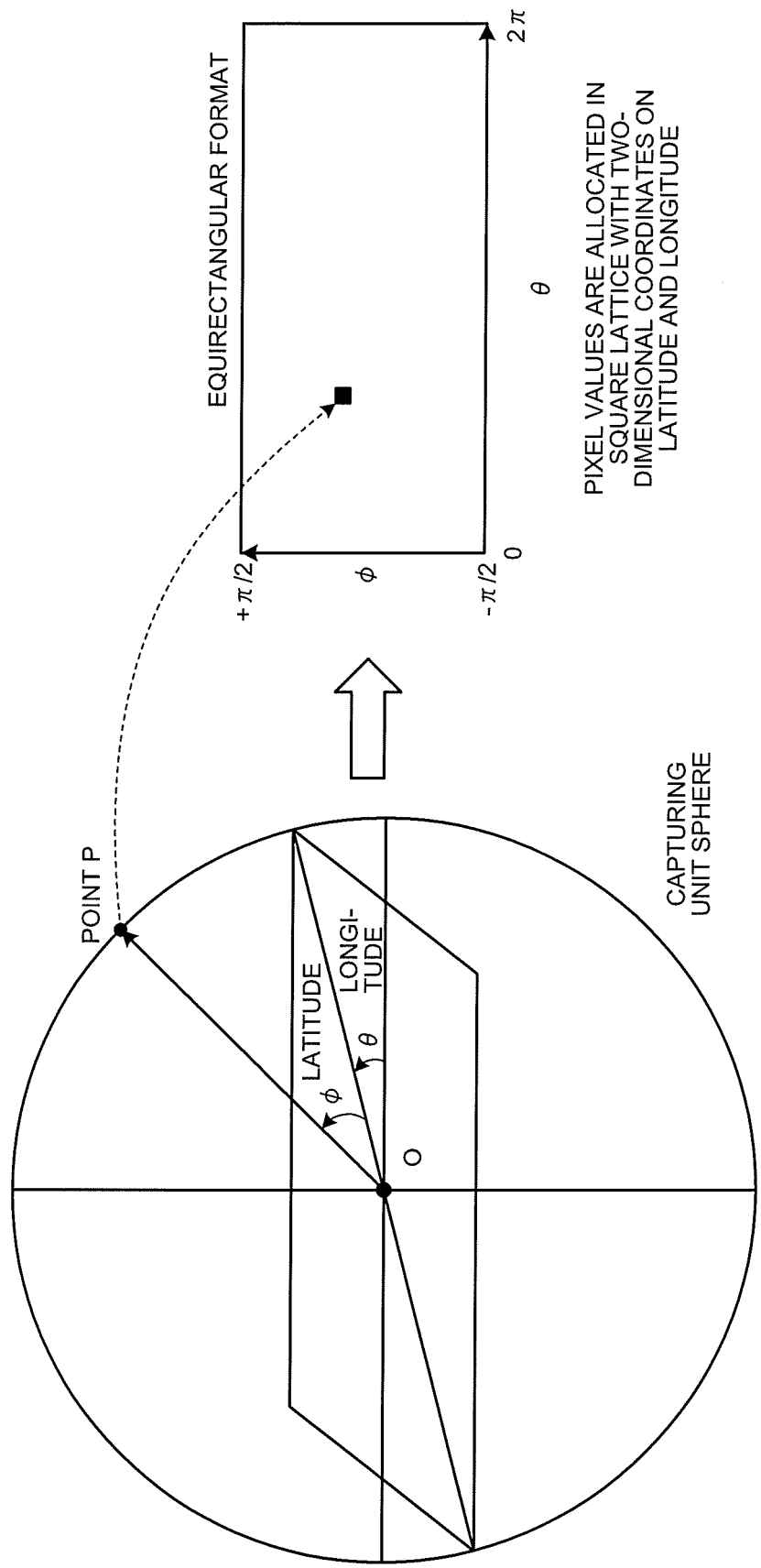
FIG. 8 is a diagram that illustrates an example of the image that is represented in the Equirectangular format where pixel values are allocated in a square lattice with two-dimensional coordinates on the latitude and the longitude.

Next, a second embodiment is explained. Explanation is omitted as appropriate for the part that is common to the first embodiment. In the example stated here, one or more important areas are extracted from an input full spherical image. The full spherical image is the image captured across the entire visual field at a horizontal angle of 360 degrees and a vertical angle of 180 degrees. As the representation format of images, it is possible to use the Equirectangular format in FIG. 8 in which pixel values are allocated in a square lattice with two-dimensional coordinates specified by the latitude and the longitude.

Figure 9:
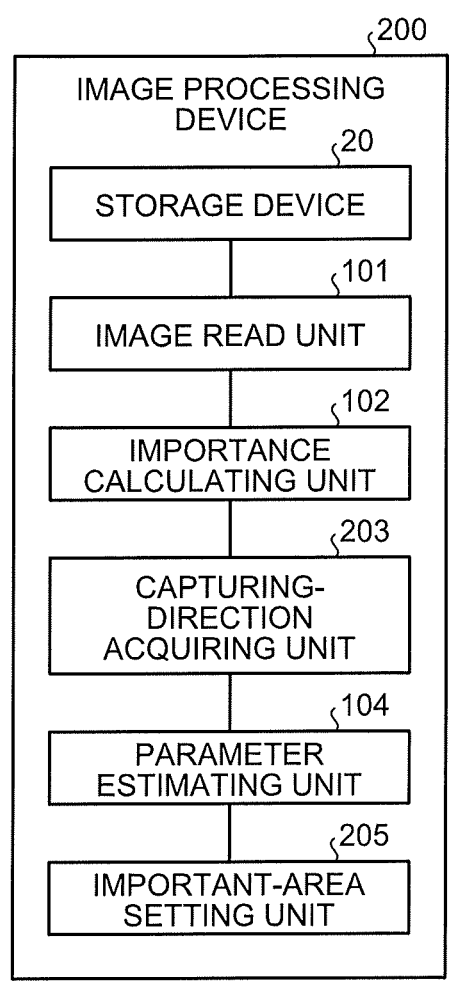
FIG. 9 is a diagram that illustrates an example of the functions provided by an image processing device according to a second embodiment.
Figure 10:
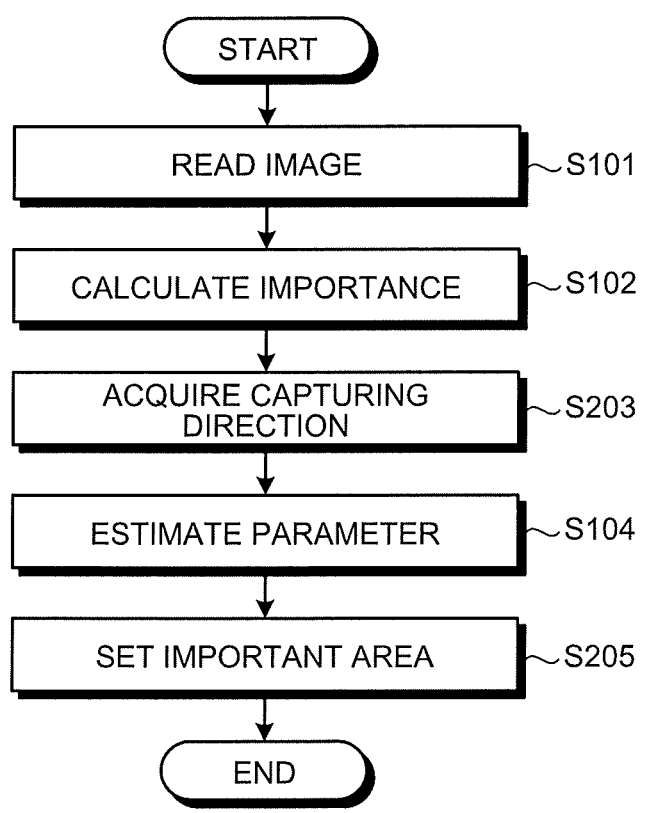
FIG. 10 is a flowchart that illustrates an operation example of the image processing device according to the second embodiment.

FIG. 9 is a diagram that illustrates an example of the functions provided by an image processing device 200 according to the present embodiment, and FIG. 10 is a flowchart that illustrates an operation example of the image processing device 200 according to the present embodiment. Basically, as its operation is the same as that in the first embodiment, only different parts are explained below.

At Step S203 illustrated in FIG. 10, a capturing-direction acquiring unit 203 calculates the capturing direction of each position in the full spherical image. If the input image has the Equirectangular format, the capturing direction is calculable in accordance with the correspondence relation between the polar coordinates and the two-dimensional coordinates in FIG. 8.

Figure 11:
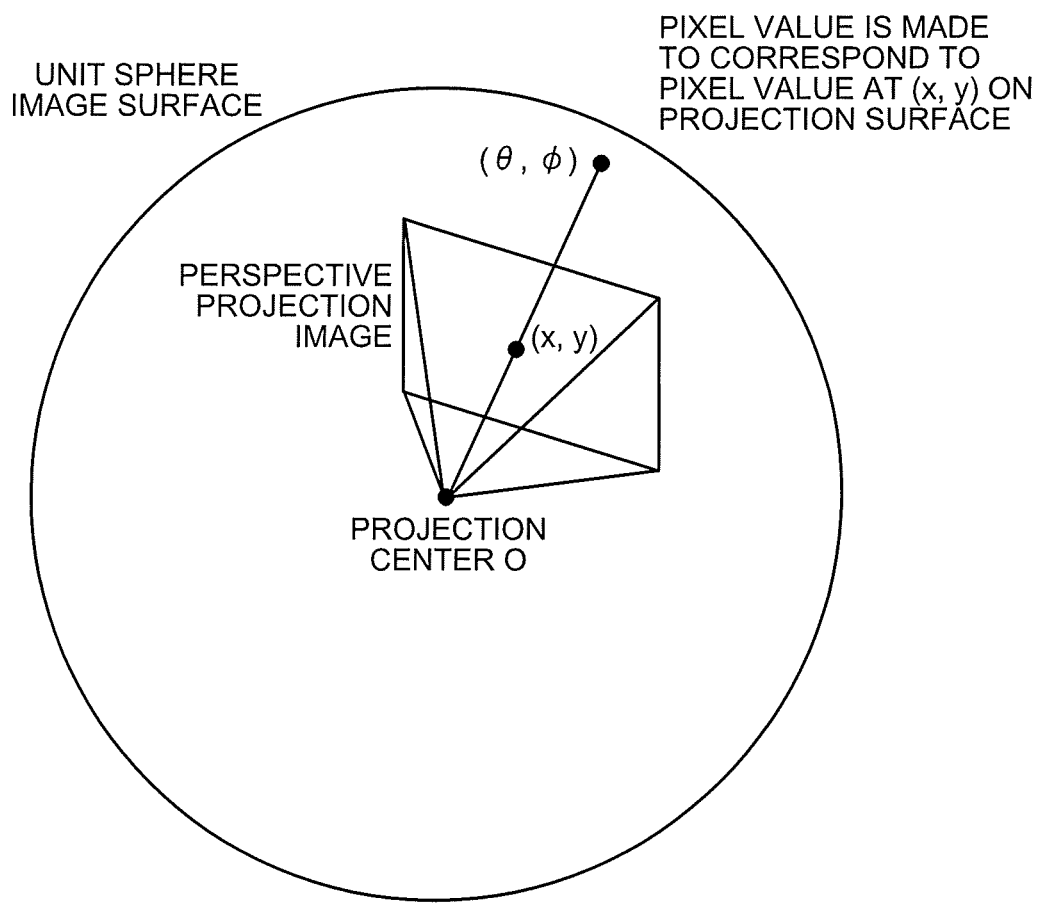
FIG. 11 is a diagram that illustrates an example of the case where an important area is set as the area that corresponds to a perspective projection image.

Furthermore, at Step S205 illustrated in FIG. 10, an important-area setting unit 205 sets an important area in accordance with the parameters of an element distribution. The important area may be set as a rectangular area on the image having the Equirectangular format or may be set as the area that corresponds to a perspective projection image as illustrated in FIG. 11.

Figure 12:
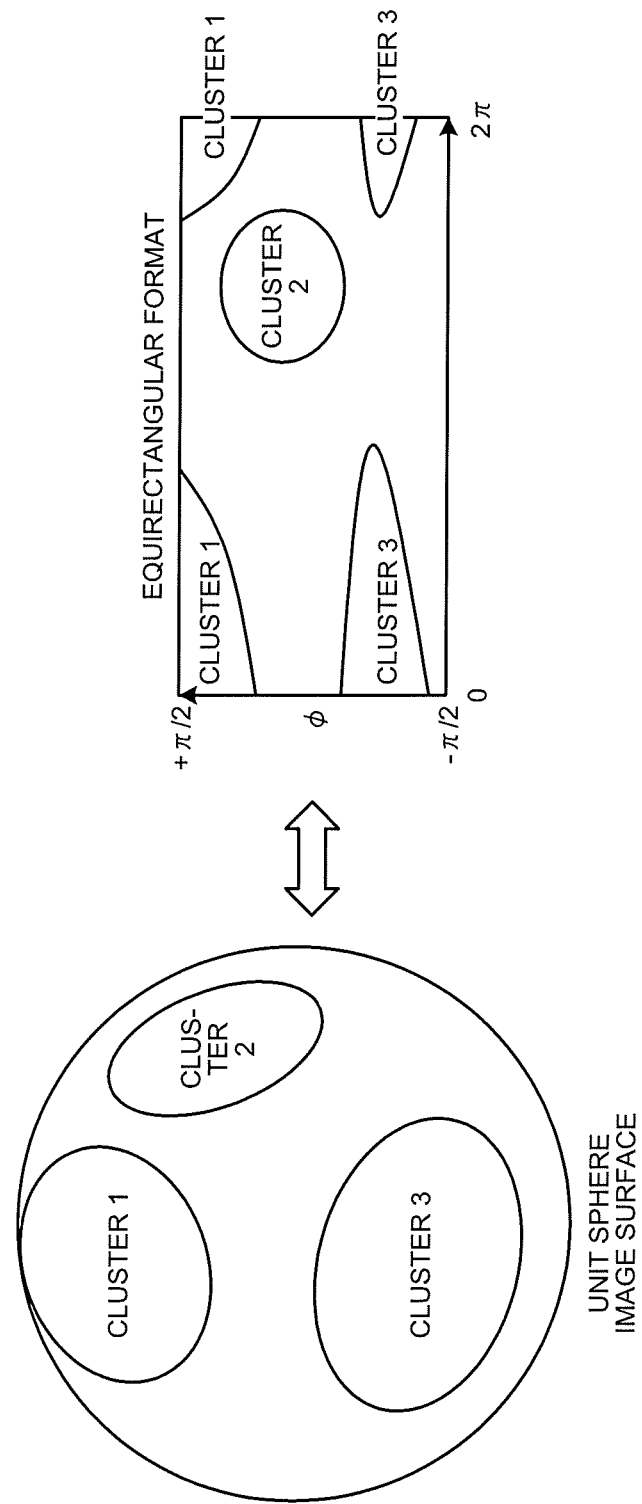
FIG. 12 is a diagram that illustrates an example of clustering conducted with respect to the capturing direction according to the second embodiment.

According to the present embodiment, one or more important areas are extractable from an input full spherical image. The right and left ends are connected to each other in the Equirectangular format illustrated in FIG. 8, and each of the top and bottom ends is converged to one point. Specifically, as in FIG. 12, if the unit sphere image is converted into an image having the Equirectangular format, the right and left ends of a cluster 1 or a cluster 3 are expanded so as to connect to each other. Furthermore, as clustering is conducted with respect to the capturing direction according to the present embodiment, important areas are extractable with the topology of the full spherical image being reflected.

Third Embodiment

Next, a third embodiment is explained. Explanation is omitted as appropriate for the same part as that in each of the embodiments. In the example stated here, one or more important areas are extracted from an input full spherical image and a moving image is generated, which is displayed by being transitioned among the important areas.

Figure 13:
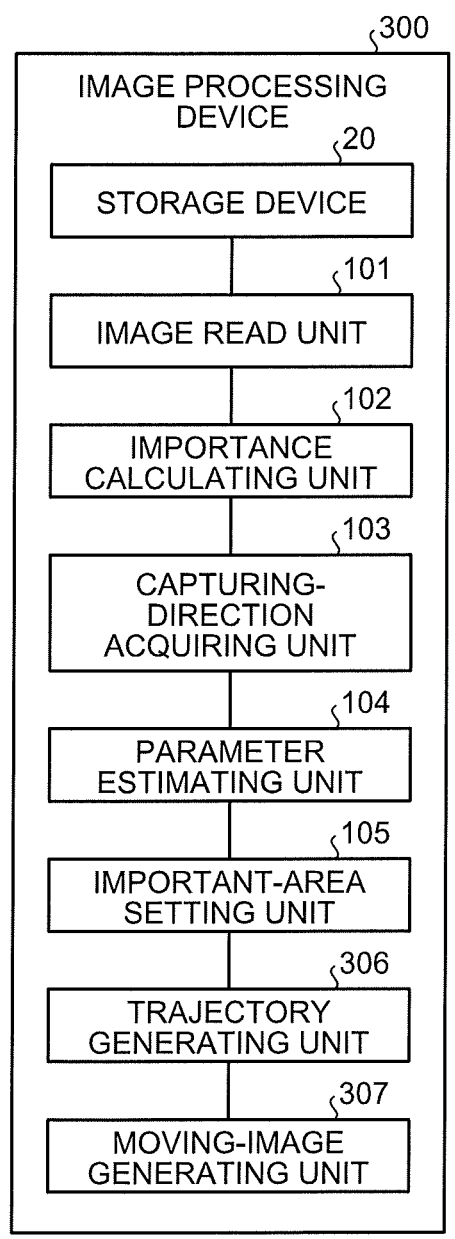
FIG. 13 is a diagram that illustrates an example of the functions provided by an image processing device according to a third embodiment.

FIG. 13 is a diagram that illustrates an example of the functions provided by an image processing device 300 according to the present embodiment. A trajectory generating unit 306 and a moving-image generating unit 307 are further included.

The trajectory generating unit 306 generates the trajectory that transitions among the set important areas. Trajectory generation needs the order of transition among important areas and determination of the actual transition trajectory. If the order of transition has been determined, the curved line for transitions among the important areas may be obtained by using for example a spline curve. The spline curve is one of the curve techniques, and it refers to the line that passes through specified points in a smooth manner. A spline curve may be determined with respect to a pixel location on a two-dimensional image or may be determined in a three-dimensional space with a unit vector in a capturing direction as a control point (see FIG. 14).

Instead of a spline curve, a trajectory may be generated to connect important areas with a straight line. Furthermore, as for the size of important areas, conducting spline interpolation may cause a smooth change when for example the size of a rectangle is to be changed. After a curved line or a straight line is generated, there is a need to determine the position s(t)=(x(t), y(t)) or s(t)=(x(t), y(t), z(t)) on the curved line at the actual time t. This may be a uniform motion, or a smooth speed change may be achieved in accordance with the minimum jerk model (see Non Patent Literature 5). In this way, it is possible to generate the transition trajectory among important areas that are ordered.

Next, an explanation is given of the method for determining the order of transition among important areas. There is a possible method to generate the transition trajectories for all the combinations (M! combinations if there are M important areas) of important areas in orders of transition, calculate the evaluation value of a trajectory, and use the transition order having the highest evaluation value. The evaluation value of a trajectory may be calculated by using for example the length of a transition curved line or straight line, the cumulative curvature, or the cumulative importance (the sum importance which the transition trajectory passes by). In short, the trajectory generating unit 306 generates trajectories for all the combinations of important areas in orders of transition, calculates the evaluation value of each trajectory by using the length of the generated trajectory, the cumulative curvature that indicates the curvatures cumulated, or the cumulative importance that indicates the importance cumulated, and determines the transition order based on the evaluation value of each trajectory.

The moving-image generating unit 307 moves a virtual camera in accordance with the transition trajectory generated by the trajectory generating unit 306 to generate a moving image that transitions among important areas.

Figure 15:
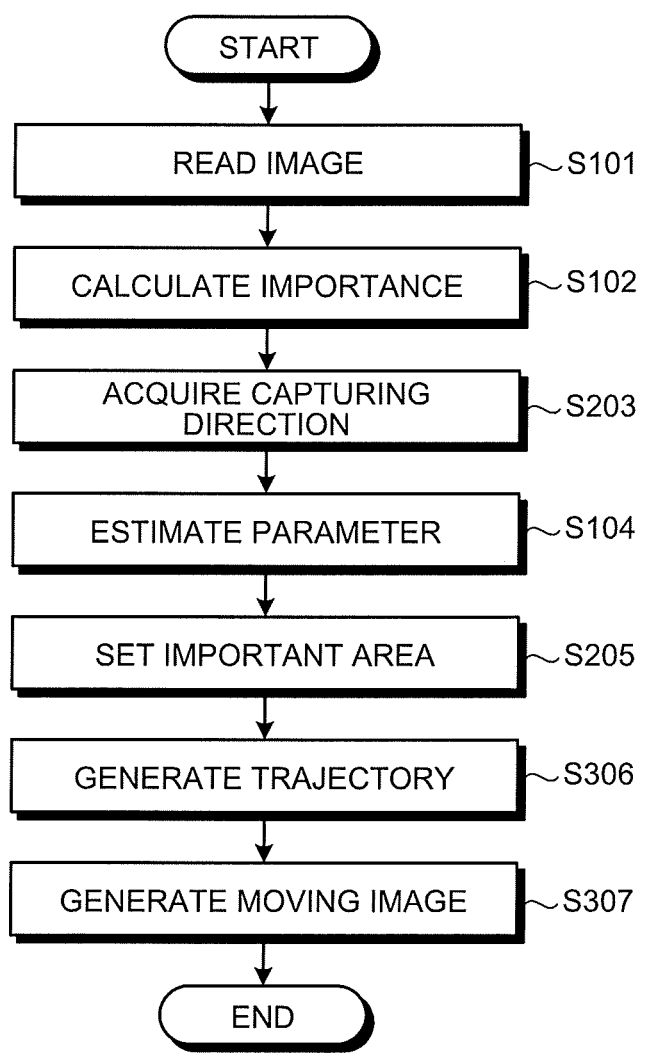
FIG. 15 is a flowchart that illustrates an operation example of the image processing device according to the third embodiment.

FIG. 15 is a flowchart that illustrates an operation example of the image processing device 300 according to the present embodiment. It is different from the flowchart illustrated in FIG. 10 in that Step S306 and Step S307 are added. At Step S306, the trajectory generating unit 306 generates the trajectory that transitions among the important areas that are set at Step S205. Then, at Step S307, the moving-image generating unit 307 moves the virtual camera in accordance with the trajectory generated at Step S306 and generates the moving image that transitions among the important areas (Step S307).

According to the present embodiment described above, one or more important areas are extracted from an input full spherical image, and a moving image may be generated which is displayed by being transitioned among the important areas. Generation of a moving image with respect to a full spherical image is described above in relation to the second embodiment; however, this is not a limitation and, for example, generation of a moving image with respect to a normal image is also possible in relation to the first embodiment.

Fourth Embodiment

Next, a fourth embodiment is explained. Explanation is omitted as appropriate for the same part as that in each of the embodiments. In the present embodiment, an explanation is given of a case where, for example, classification is performed on input images and important-area setting and trajectory generation are conducted in different variations in accordance with classification.

Figure 16:
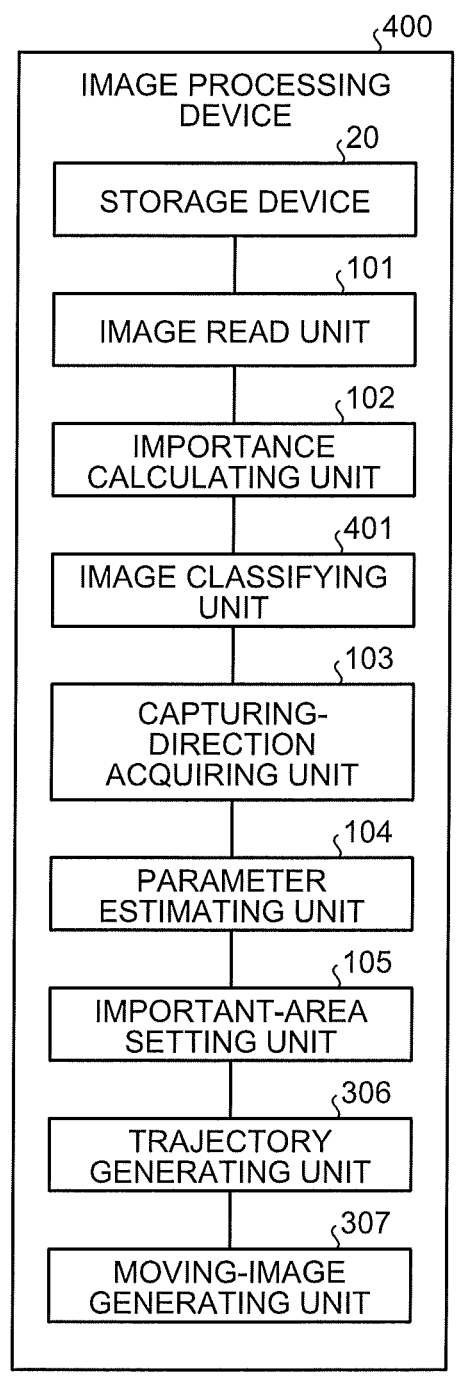
FIG. 16 is a diagram that illustrates an example of the functions provided by an image processing device according to a fourth embodiment.

FIG. 16 is a diagram that illustrates an example of the functions provided by an image processing device 400 according to the present embodiment. As illustrated in FIG. 16, the image processing device 400 is different from the configuration illustrated in FIG. 13 in that it further includes an image classifying unit 401.

The image classifying unit 401 estimates the category of the image for which the importance has been calculated and variably sets the method of setting an important area in accordance with the estimated category. In this example, the image classifying unit 401 variably sets the method of setting an important area and the method of generating a trajectory in accordance with the estimated category. For image classification, it is possible to use a typical image classification algorithm as in for example Non Patent Literature 6. Possible classification categories include person, scenery, sport, and the like. For person images, the number of clusters is set to be large in specifying an important area so that each individual can be extracted; for scenery images, conversely the number of clusters is set to be small so that the whole may be put together as one; and for sports, the transition speed is increased in generating the trajectory, for example. These are prepared as a table in which each image category is associated with a parameter (a parameter for setting an important area or a parameter for generating a trajectory), so as to be referred to by the important-area setting unit 105 and the trajectory generating unit 306.

Furthermore, in another variation, parameters for important-area setting and trajectory generation can be determined from the importance distribution extracted. For example, if the importance distribution largely disperses, many important things spread in the image; therefore, at first the whole is set as a single important area and then gets clustered into important areas in stages and, in generating the trajectory, a trajectory can be generated such that the entire image transitions to an individual part. In each variation for the importance distribution as described above, a parameter for important-area setting and a parameter for trajectory generation may be associated and prepared in a table format and they may be used by the important-area setting unit 105 and the trajectory generating unit 306.

Figure 17:
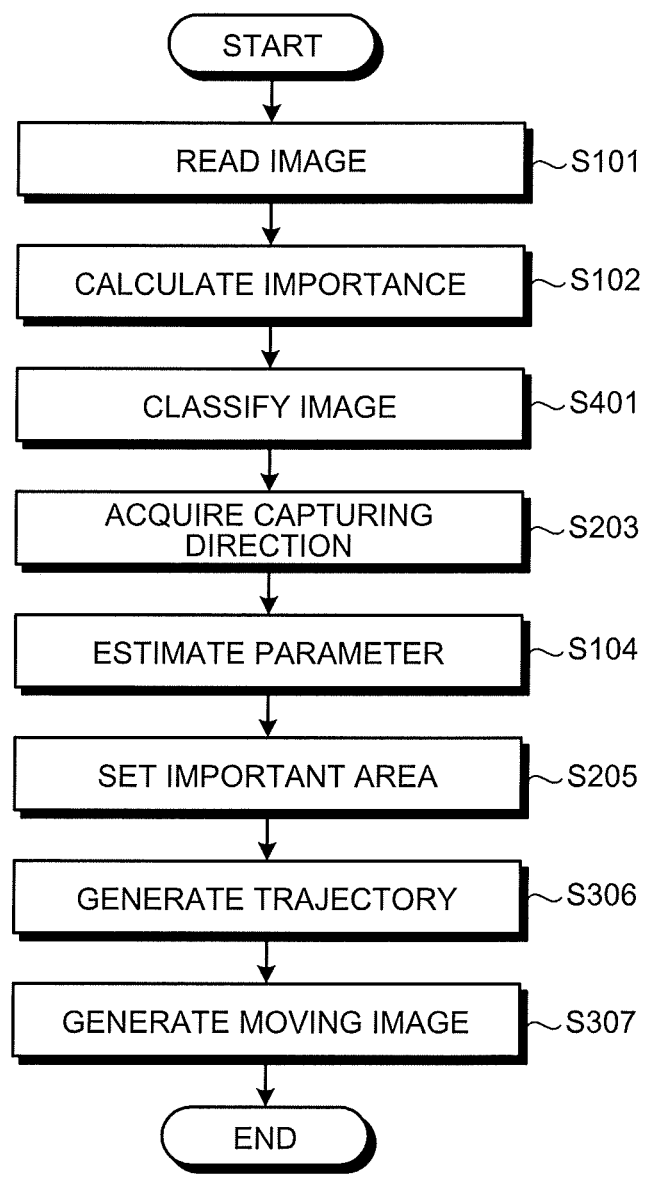
FIG. 17 is a flowchart that illustrates an operation example of the image processing device according to the fourth embodiment.

FIG. 17 is a flowchart that illustrates an operation example of the image processing device 400 according to the present embodiment. It is different from the flowchart illustrated in FIG. 15 in that Step S401 is added. At Step S401, the image classifying unit 401 estimates the category of the image for which the importance has been calculated at Step S102 and selects the parameter for important-area setting and the parameter for trajectory generation, associated with the estimated category. Then, each of the selected parameters is made usable by the important-area setting unit 105 at Step S205 and is made usable by the trajectory generating unit 306 at Step S306.

According to the present embodiment described above, important-area generation and trajectory generation may be conducted by switching the parameter for important-area setting and the parameter for trajectory generation in accordance with classification of an input image. Furthermore, in a case where the present embodiment is adapted to the first embodiment, without conducting trajectory generation, important-area generation may be conducted by switching the parameter for important-area setting in accordance with classification of an input image.

Fifth Embodiment

Next, a fifth embodiment is explained. Explanation is omitted as appropriate for the same part as that in each of the embodiments. According to the present embodiment, one or more important areas are set on consideration of image characteristics that are extracted from an input image.

Details are explained below.

Figure 18:
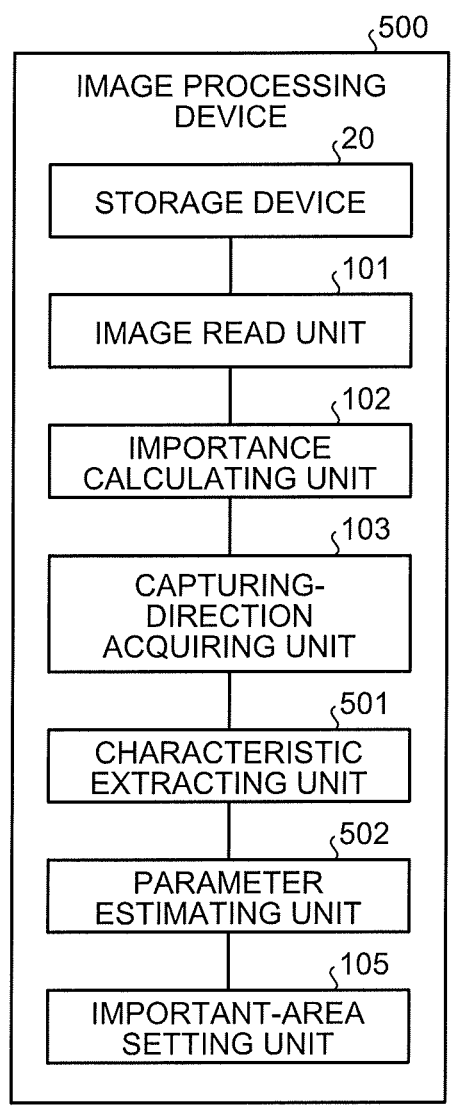
FIG. 18 is a diagram that illustrates an example of the functions provided by an image processing device according to a fifth embodiment.

FIG. 18 is a diagram that illustrates an example of the functions provided by an image processing device 500 according to the present embodiment. As illustrated in FIG. 18, the image processing device 500 is different from the configuration in FIG. 3 according to the first embodiment in that it further includes a characteristic extracting unit 501. Furthermore, the function of a parameter estimating unit 502 is different from the function of the parameter estimating unit 104 illustrated in FIG. 3 according to the first embodiment. The difference is explained below.

The characteristic extracting unit 501 extracts the feature vector of each of the positions in the image to be processed. In this example, the characteristic extracting unit 501 extracts each image location and the characteristics of the local region that includes it from an input image. Here, as the characteristics, typical image characteristics used for image recognition technologies may be used, such as histograms of color or edge (direction, intensity) at each pixel location or of color or edge at the local region, a frequency component (Fourier coefficient, DCT coefficient), grayscale pattern (LBP, Haar-like characteristics), or neural network output. These characteristics are obtained for each capturing direction that is acquired by the capturing-direction acquiring unit 103. Specifically, for each capturing direction that is acquired by the capturing-direction acquiring unit 103, the characteristic extracting unit 501 extracts the feature vector at the position that corresponds to the capturing direction, included in the image to be processed.

The parameter estimating unit 502 regards the importance distributions for the respective vectors each connecting a feature vector and a vector of the capturing direction as a mixture distribution made up of element distributions and estimates parameters of each of the element distributions. Although the importance distribution is clustered with respect to a capturing direction according to the first embodiment, clustering is conducted with respect to image characteristics in addition to the capturing direction according to the present embodiment. Specifically, although the variable $x_n$ is a three-dimensional vector in the capturing direction (X, Y, Z) according to the first embodiment, C-dimensional image characteristics are added to it so that $x_n$ is redefined as a C+three-dimensional vector. In form, only the number of dimensions is different, and clustering may be conducted by the same calculation as that in the first embodiment. Here, it is preferable that a multi-dimensional normal distribution, or the like, is assigned to the probability density function of a feature value, contrary to the probability density function of a capturing direction. It is obvious that a von Mises-Fisher distribution is usable by obtaining a unit vector as is the case with the capturing direction. If the von Mises-Fisher distribution is used, the angle made between feature vectors is evaluated, and it is effective if the magnitude of a characteristic vector is meaningless.

Figure 19:
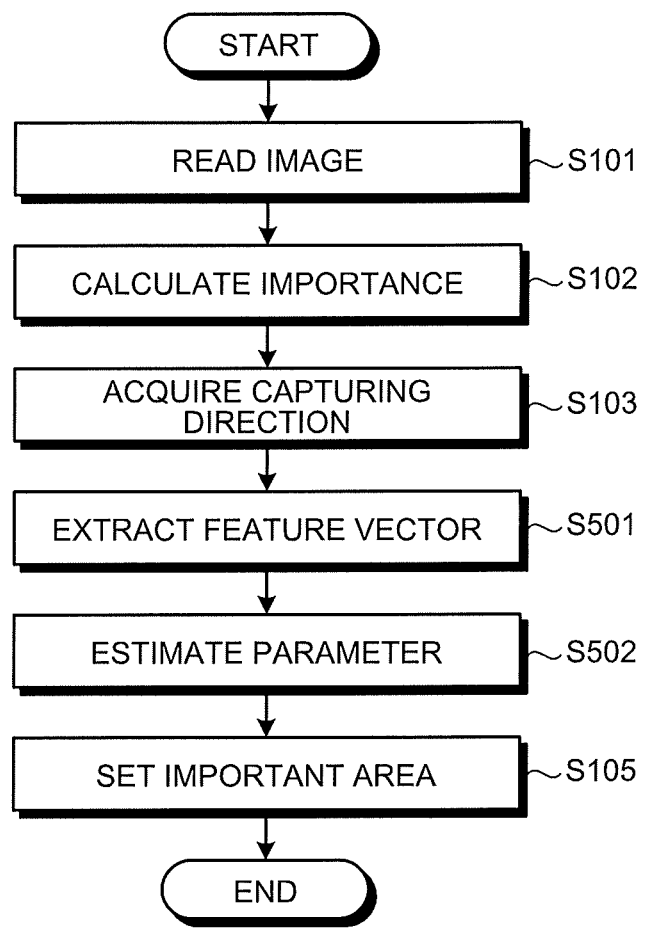
FIG. 19 is a flowchart that illustrates an operation example of the image processing device according to the fifth embodiment.

FIG. 19 is a flowchart that illustrates an operation example of the image processing device 500 according to the present embodiment. Part of the operations at Step S501 and Step S502 are different from the flowchart illustrated in FIG. 6. At Step S501, the characteristic extracting unit 501 extracts a feature vector with respect to each capturing direction acquired at Step S103. Next, at Step S502, the parameter estimating unit 502 regards the importance distributions for the respective vectors each connecting a feature vector and a vector of the capturing direction as a mixture distribution made up of element distributions and estimates the parameters of each of the element distributions.

As described above, according to the present embodiment, one or more important areas may be set on consideration of the image characteristics of an input image. Contrary to the first embodiment where clustering is simply conducted with regard to closeness of the capturing direction, the areas having similar characteristics may be grouped together according to the present embodiment; thus, division of important areas may be further consistent with contents of the image.

Figure 20:
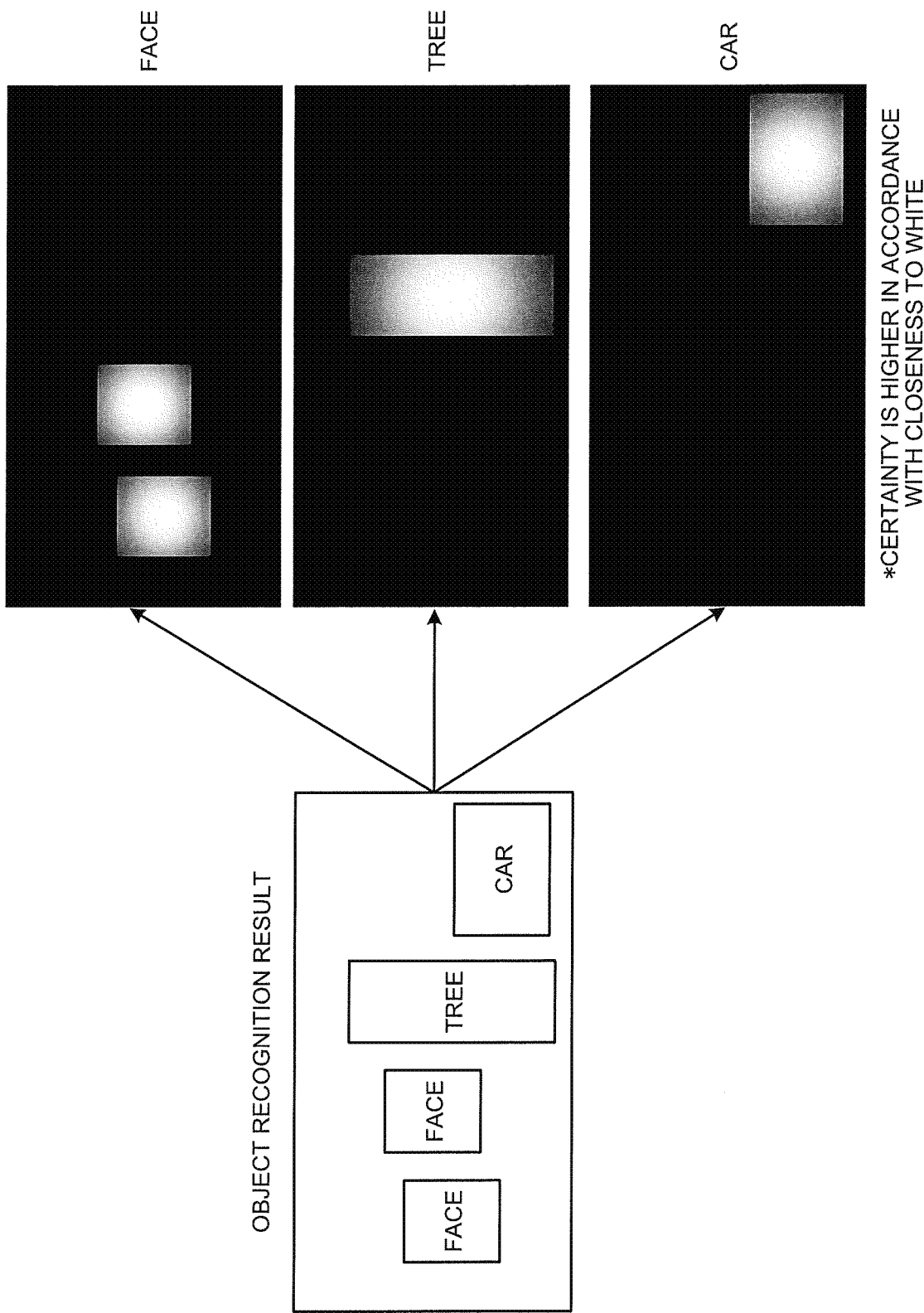
FIG. 20 is a diagram that illustrates a case where the certainty of an object obtained from an object recognition result is used as image characteristics.

As a modified example, the certainty of an object obtained from an object recognition result may be used as image characteristics. FIG. 20 illustrates an example: the certainty of each object label is determined at each pixel location from an object recognition result, and it is set as a feature value. Although the method of calculating the certainty depends on an object recognition algorithm, typically the posterior probability of an object may be used, or it may be moderately attenuated from the center of the object detection position ad hoc. Furthermore, from the obtained object characteristics, an aesthetic evaluation value of a partial image may be calculated and applied to clustering. For example, the partial image where the primary straight line is horizontal may receive a high evaluation, or the vanishing point being located at the center of the image may receive a high evaluation. This kind of evaluation function is added to the above-described Equation (4) and the above-described Equation (5) so that optimization may be achieved with the same framework.

Although an explanation is given above of a difference from the first embodiment, the configuration according to the present embodiment may be combined with other embodiments.

Sixth Embodiment

Next, a sixth embodiment is explained. Explanation is omitted as appropriate for the same part as that in each of the embodiments. The present embodiment describes an example where important areas are set through interaction between a user and a system (an image processing device 600).

Figure 21:
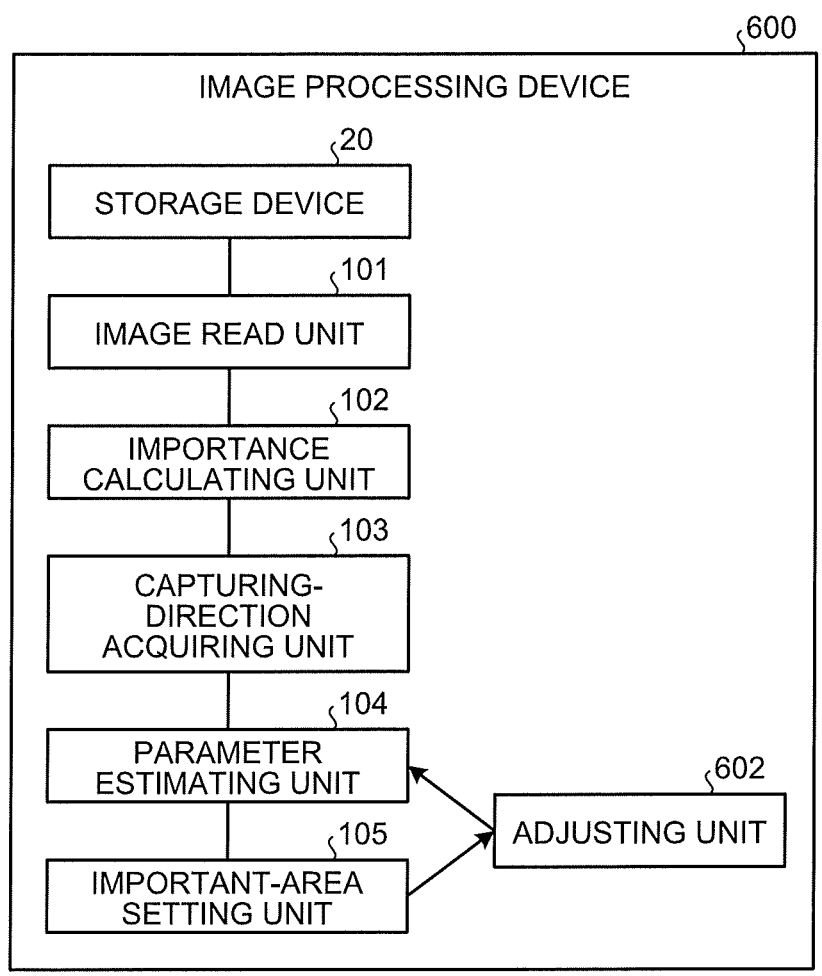
FIG. 21 is a diagram that illustrates an example of the functions provided by an image processing device according to a sixth embodiment.

FIG. 21 is a diagram that illustrates an example of the functions provided by the image processing device 600 according to the present embodiment. As illustrated in FIG. 21, the image processing device 600 is different from the configuration in FIG. 3 in that it further includes an adjusting unit 602. The adjusting unit 602 adjusts an important area or a trajectory (a transition trajectory of important areas) in accordance with input from the user. Here, based on the configuration according to the first embodiment, the adjusting unit 602 adjusts an important area in accordance with input from the user. Furthermore, the configuration according to the present embodiment is applicable to other embodiments: for example, the configuration according to the present embodiment may be applied to the third embodiment so that the adjusting unit 602 adjusts a trajectory in accordance with input from the user.

Figure 22:
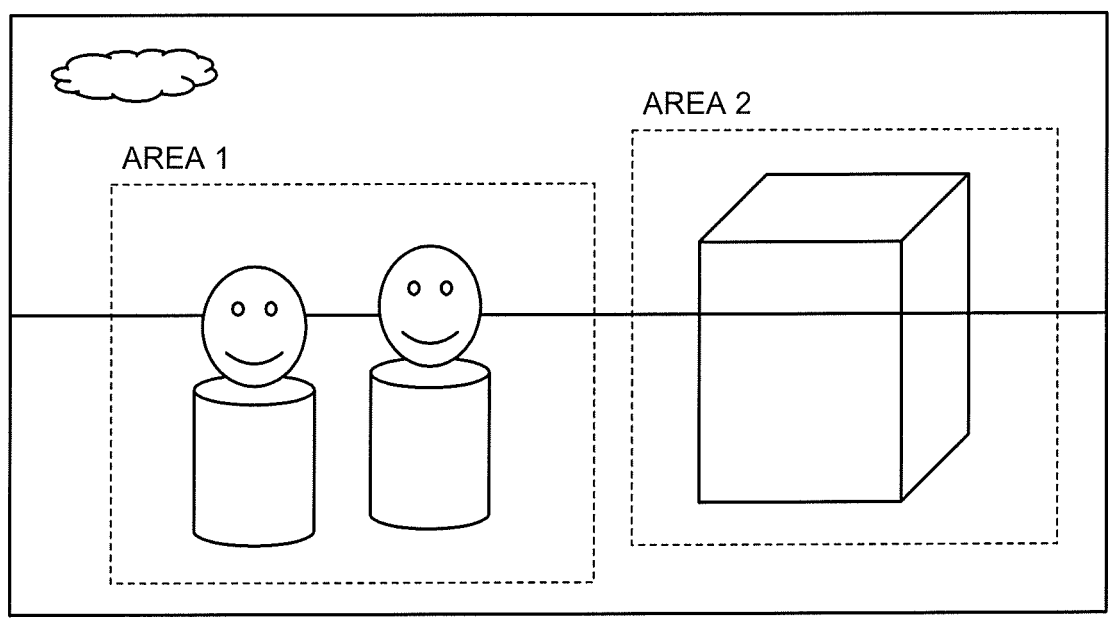
FIG. 22 is a diagram that illustrates an example of the screen that is presented to users according to the sixth embodiment.

In this example, the adjusting unit 602 presents the important area set by the important-area setting unit 105 to the user by conducting control so as to display it on the display unit 15. FIG. 22 illustrates an example where two rectangular important areas (an area 1, and area 2) are displayed on the input image in a superimposed manner. The user performs an operation to drag and drop the important area through the input unit 14 so as to input a command to change the position or the size to the system. After receiving input via the input unit 14, the adjusting unit 602 adjusts (corrects) the important area in accordance with the received input. Then, when the user makes a notification to the system that adjustment of the area is completed (e.g., makes an input through the input unit 14), the system (the adjusting unit 602) terminates the process and outputs the important area as an adjustment result. Furthermore, after adjustment, the user may also input a command for re-clustering to the system. In such a case, the adjusting unit 602 applies the position adjusted by the user to the prior distributions $p(\mu)$, $p(k)$ in the above-described Equation (5) (e.g., the mean value of the prior distribution is matched to the position or size designated by the user), and the parameter estimating unit 104 performs clustering again. Furthermore, clustering may be performed again after a command for the number of clusters is received from the user. In this way, important areas may be set by the user and the system in an interactive manner.

Although explanation is given above of a difference from the first embodiment, the configuration according to the present embodiment may be combined with other embodiments. For example, in combination with the third embodiment, a user may designate an evaluation function for generating a trajectory or the order of presenting important areas.

Furthermore, a configuration may be such that the program executed by the image processing device 100 according to embodiments is provided by being stored, in the form of a file that is installable and executable, in a recording medium readable by a computer, such as a CD-ROM, a flexible disk (FD), a CD-R, a DVD (digital versatile disk), or a USB (Universal Serial Bus), or a configuration may be such that it is provided or distributed via a network such as the Internet. Moreover, a configuration may be such that various programs are provided by being previously installed in a ROM, or the like.

According to the present invention, important areas are settable while considering the influence of the actual capturing direction.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing device, comprising:
processing circuitry configured to
calculate an importance of each position of a plurality of positions in an image;
acquire, for each position of the plurality of positions, a capturing direction in a three-dimensional space;
regard importance distributions in respective capturing directions as a mixture distribution made up of plural element distributions, so as to estimate a parameter of each element distribution of the plural element distributions based on a corresponding importance distribution with respect to the capturing direction; and
set plural areas from the image, each area being set in accordance with a respective parameter of the estimated parameters.

2. The image processing device according to claim 1, wherein
each element distribution is a von Mises-Fisher distribution,
each parameter includes a first parameter that indicates a mean direction of the corresponding element distribution and a second parameter that indicates a degree to which the corresponding element distribution is concentrated in a vicinity of the mean direction, and
the processing circuitry sets each area by setting the mean direction indicated by the first parameter as a center and determining a size based on the degree indicated by the second parameter.

3. The image processing device according to claim 1, wherein the processing circuitry uses any of a k-means method, an EM algorithm, a variational Bayesian method, and a Monte Carlo method as a method for estimating the parameters of the element distribution.

4. The image processing device according to claim 1, wherein the processing circuitry is further configured to generate a trajectory that transitions between the set areas.

5. The image processing device according to claim 1, wherein the processing circuitry is further configured to:
generate trajectories for all combinations of the areas in orders of transition, calculate an evaluation value of each of the trajectories by using a length of the trajectory generated or a cumulative curvature that indicates curvatures cumulated, and determine an order of transition based on the evaluation values of the respective trajectories.

6. The image processing device according to claim 1, wherein the processing circuitry is further configured to estimate a category of the image and variably set a method of setting the area in accordance with the category estimated.

7. The image processing device according to claim 1, wherein the processing circuitry is further configured to extract a feature vector of each of the positions, and regard importance distributions for respective vectors each connecting the feature vector and a vector of the capturing direction as a mixture distribution made up of element distributions to estimate the parameter of each of the element distributions.

8. The image processing device according to claim 1, wherein the processing circuitry is further configured to adjust an area or a trajectory in accordance with input from a user.

9. The image processing device according to claim 1, wherein the image is a spherical image.

10. The image processing device according to claim 9, wherein the plurality of positions in the spherical image are represented in the three-dimensional space, and the processing circuitry is configured to set the plural important areas from the spherical image.

11. The image processing device according to claim 1, wherein the image is a moving image.

12. An image processing method, comprising:

calculating, by processing circuitry of an image processing device, an importance of each position of a plurality of positions in an image;

acquiring, by the processing circuitry, for each position of the plurality of positions, a capturing direction in a three-dimensional space;

regarding importance distributions in respective capturing directions as a mixture distribution made up of plural element distributions, so as to estimate a parameter of each element distribution of the plural element distributions based on a corresponding importance distribution with respect to the capturing direction; and setting plural areas from the image, each area being set in accordance with a parameter of the estimated parameters.

13. The image processing method according to claim 12, wherein the image is a spherical image.

14. The image processing method according to claim 12, wherein the image is a moving image.

15. The image processing method according to claim 12, further comprising:

generating trajectories for all combinations of the areas in orders of transition;

calculating an evaluation value of each of the trajectories by using a length of the trajectory generated or a cumulative curvature that indicates curvatures cumulated; and determining an order of transition based on the evaluation values of the respective trajectories.

16. The image processing method according to claim 12, further comprising:

estimating a category of the image and variably set a method of setting the area in accordance with the category estimated.

17. The image processing method according to claim 12, further comprising:

adjusting an area or a trajectory in accordance with input from a user.

18. A non-transitory computer-readable medium including instructions, the instructions causing processing circuitry of a computer to execute:

calculating an importance of each position of a plurality of positions in an image;

acquiring, for each position of the plurality of positions, a capturing direction in a three-dimensional space;

regarding importance distributions in respective capturing directions as a mixture distribution made up of plural element distributions, so as to estimate a parameter of each element distribution of the plural element distributions based on a corresponding importance distribution with respect to the capturing direction; and setting plural areas from the image, each area being set in accordance with a parameter of the estimated parameters.

19. The non-transitory computer-readable medium according to claim 18, wherein the image is a spherical image.

20. The non-transitory computer-readable medium according to claim 18, wherein the image is a moving image.

* * * * *